US006655799B1

United States Patent
Chen

(10) Patent No.: US 6,655,799 B1
(45) Date of Patent: Dec. 2, 2003

(54) CLIP-ON LENSES

(76) Inventor: Daniel Chen, 37-11 59th St., Woodside, NY (US) 11377

( * ) Notice: Subject to any disclaimer, the term of this patent is extended or adjusted under 35 U.S.C. 154(b) by 0 days.

(21) Appl. No.: 10/232,467

(22) Filed: Aug. 30, 2002

(51) Int. Cl.[7] .................................................. G02C 9/00
(52) U.S. Cl. .......................................... 351/47; 351/57
(58) Field of Search ............................ 381/47, 57, 44, 381/41

(56) References Cited

U.S. PATENT DOCUMENTS

| 5,975,691 A | 11/1999 | Ku | 351/47 |
|---|---|---|---|
| 6,053,611 A | 4/2000 | Ku | 351/47 |
| 6,478,420 B2 * | 11/2002 | Xiang | 351/47 |

* cited by examiner

Primary Examiner—Hung Xuan Dang

(74) Attorney, Agent, or Firm—Michael I. Kroll

(57) ABSTRACT

A clip-on lens for selectively covering a lens of a pair of eyeglasses. The eyeglasses include first and second transparent lenses. Each lens includes at least two holes extending therethrough. Also included is a first and second extension arm, a nose bridge and a plurality of ferromagnetic studs. Each stud extends through a respective hole in the first and second lens for connecting the first lens between the first arm and the nose bridge and the second arm and the nose bridge. The clip-on lens includes at least two holes extending therethrough which are substantially aligned with the holes in a respective one of the transparent first and second lenses. Magnets are positioned within the at least two holes in the clip-on lens. Upon positioning the clip on lens against a respective one of the first and second transparent lenses, a magnetic coupling is formed between the magnets and respective ferromagnetic studs thereby selectively holding the respective one of the first and second transparent lenses. The clip-on lenses have a size and shape substantially similar to a size and shape of said first and second transparent lenses. Additionally, the clip-on lenses cone in various tints.

5 Claims, 11 Drawing Sheets

CLIP-ON LENSES

BACKGROUND OF THE INVENTION

1. Field of the Invention

The present invention relates generally to eyeglasses and, more specifically, to eyeglasses having a frame with a plurality of ferromagnetic studs acting as a structural feature that connects the frame, to a set of conventional eyeglass lenses while additionally providing a plurality of protruding ferromagnetic stud heads that act as points of connection between a second set of clip-on lenses outfitted with corresponding magnets having a polarity that produces an attraction between the ferromagnetic studs and the lenses having magnetic elements contained therein.

2. Description of the Prior Art

There are other eyeglass devices designed for connection of a plurality of lenses. Typical of these is U.S. Pat. No. 5,975,691 issued to Ku on Nov. 2, 1999 and U.S. Pat. No. 6,053,611 also issued to Ku on Apr. 25, 2000.

While these eyeglasses may be suitable for the purposes for which they were designed, they would not be as suitable for the purposes of the present invention, as herein after described.

U.S. Pat. No. 5,975,691

Inventor: Kuo-Hseng Ku

Issued: Nov. 2, 1999

A detachable auxiliary sunglasses with magnets are provided, including a rim, sunglasses lenses mounted within the rim, and two magnets each pivoted to a respective end piece of the rim. The auxiliary sunglasses can be secured to a primary eyeglasses, which have two magnets in positions corresponding to the positions of the magnets of auxiliary sunglasses, by means of a bond between the magnets attracting each other. The magnets are pivoted to the end pieces of the auxiliary sunglasses are capable of turning according to the position of the magnets of the primary eyeglasses so as to maintain a close contact with the same when distance between two temples of the primary eyeglasses broadens when wearing the eyeglasses.

U.S. Pat. No. 6,053,611

Inventor: Kuo-Hseng Ku

Issued: Apr. 25, 2000

A pair of auxiliary glasses with magnets in the present invention are provided with an upper and a lower against flanges which are backwardly protrudent on the bridge. Two magnets are respectively inserted in the upper and the lower against flanges, which are corresponding to each other. A pair of primary eyeglasses are provided with a magnet inserted in a proper position of the bridge. The bridge of the primary eyeglasses is capable of being inserted into the space between the upper and the lower against flanges of the bridge of the auxiliary glasses. Therefore, the auxiliary glasses can firmly attach to the primary eyeglasses not only by the function of the upper and the lower against flanges firmly clipping the bridge of the primary eyeglasses but also by the magnetic forces of the magnets.

SUMMARY OF THE PRESENT INVENTION

The present invention relates generally to eyeglasses and, more specifically, to eyeglasses having a frame with a plurality of ferromagnetic studs acting as a structural feature that connects the frame, to a set of conventional eyeglass lenses while additionally providing a plurality of protruding ferromagnetic stud heads that act as points of connection between a second set of clip-on lenses outfitted with corresponding magnets having a polarity that produces an attraction between the ferromagnetic studs and the lenses having magnetic elements contained therein.

The frame of the present invention typically is composed of a plurality of frame members made of metal or a polymeric substance that provide for a central bridge portion to accommodate the wearers nose, and other extending arm portions having a hinged section for folding, that gain support on the wearers face by resting on the ears. Between the extending arm portions and central bridge portion, lenses are attached there between by ferromagnetic studs attached through the lens completing the base eyeglass form used for standard vision enhancement. When a sunglass construction is desired for the reduction of light passing through the lens or for a different aesthetic appearance, clip-on lenses having a differentiating or matching construction in the form of pigment, tint, shape or thickness can be placed thereupon the existing lens and protruding ferromagnetic studs to engage recesses containing magnetic elements on the clip-on lenses.

A primary object of the present invention is to provide eyeglasses having a plurality of ferromagnetic studs for the attachment thereon of individual magnetic clip-on lenses that will overcome the shortcomings of the prior art.

Another object of the present invention is to provide eyeglasses having a plurality of ferromagnetic studs that serve as a joining member between the eyeglass frame portions and lenses.

Yet another object of the present invention is to provide eyeglasses having a plurality of differentiating clip-on lenses that vary in thickness, shape and pigment.

Still yet another object of the present invention is to provide eyeglasses having magnetic elements attached and recessed into the clip-on lens.

Another object of the present invention is to provide eyeglasses having protruding ferromagnetic studs that fit into corresponding recesses and magnetic elements within, on a clip-on lens and aligned with the ferromagnetic studs for producing a magnetic connection therebetween.

Yet another object of the present invention is to provide eyeglasses that are easily convertible from clear lens to tinted or vice versa by establishing or breaking the magnetic connection between the ferromagnetic studs and the magnetic elements within the clip on lens.

Additional objects of the present invention will appear as the description proceeds.

The present invention overcomes the shortcomings of the prior art by providing eyeglasses having ferromagnetic studs that act as a connection means between the frame and lens that additionally provide a surface that may be inserted into recesses having magnetic elements therein on a clip-on lens for the conversion from the appearance of standard clear lens eye glasses to the appearance and function of tinted lenses or sunglasses.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
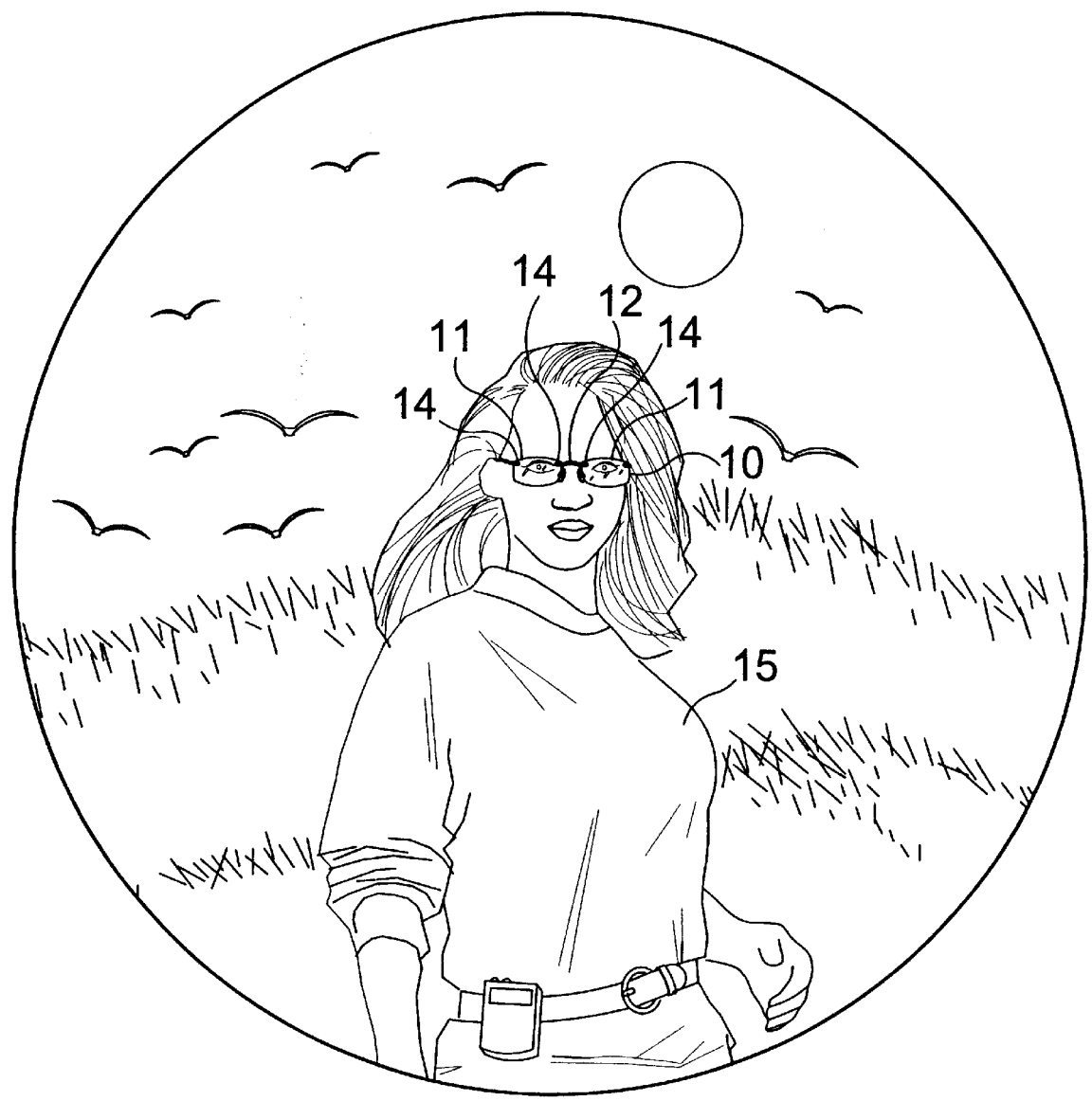
FIG. 1 is an illustrative view of the clip-on lenses of the present invention in use.

Turning now descriptively to the drawings, in which similar reference characters denote similar elements throughout the several views, the Figures illustrate the eyeglass frame and accompanying clip-on lenses of the present invention. With regard to the reference numerals used, the following numbering is used throughout the various drawing figures:
11 clip on lens
12 nose bridge
13 lenses
14 ferromagnetic stud
15 user
16 left lens
18 right lens
19 lens hole
20 nose pads
21 cap nut
22 extension arm
23 threaded shaft
24 pivot point
25 extension arm hole
26 left clip-on lens
27 clip-on lens hole
28 right clip-on lens
30 magnet
31 magnet holder
32 stud head

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout and the several views, FIGS. 1 through 11 illustrate the clip-on lenses and eyeglass frame of the present invention.

FIG. 1 is an illustrative view of the clip-on lenses 11 of the present invention in use. An often-popular style of eyewear is eyeglasses lacking a rim circumferencing the lenses thereof The eyeglass frame of the present invention 10 provides a means in which a tinted or otherwise variant lens may be attached to an eyeglass frame lacking such rims. The eyeglass frame of the present invention 10 includes a plurality of ferromagnetic studs 14 that secure a left lens 16 and right lens 18 to the frame 10. Positioned between the left and right lenses 16 and 18 is a nose bridge 12, also connected to the left and right lenses 16 and 18 by studs 14. In addition to securing the lenses 13 and frame together, the ferromagnetic head of the studs 14 act as an anchoring means for a second set of clip-on shaded lenses 11 to be set into place without necessitating such a rim, nor bulky clips. Thus, the eyeglasses maintain a neat and fashionable appearance, while the clip-on lenses 11 of the present invention are attached thereto. The eyeglasses 10 and clip-on lenses 11 of the present invention are shown in FIG. 1 being worn by a user 15.

Figure 2:
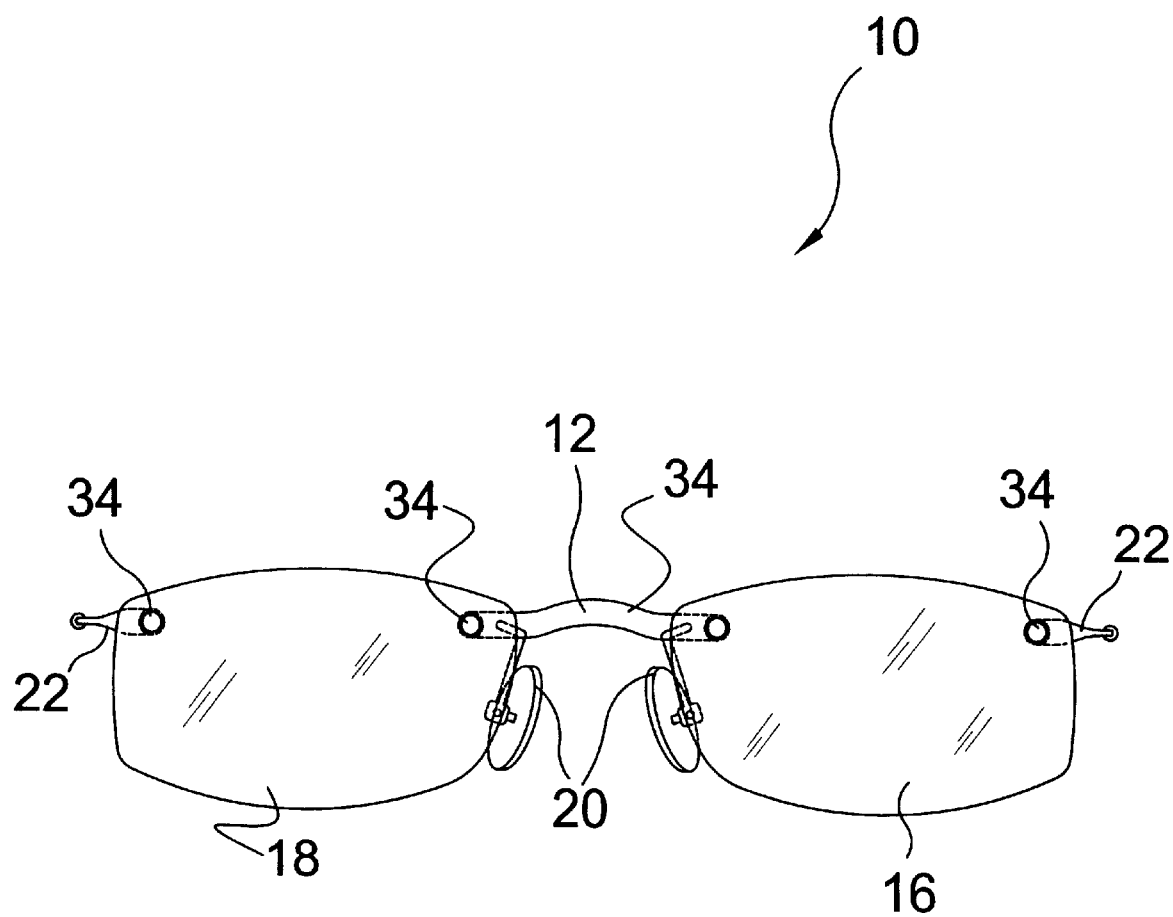
FIG. 2 is a front view of a pair of eyeglasses of the present invention having a frame with ferromagnetic studs protruding from the lenses thereof.

FIG. 2 is a front view of an eyeglass frame 10 of the present invention. Ferromagnetic studs 14 are used to connect the lenses 13 to the frame 10. The left lens 16 and the right lens 18 are each also connected to opposite ends of the nose bridge 12 by ferromagnetic studs 14. Connected to the nose bridge 12 are two nose pads 20 for receiving a users nose therebetween and for supporting the eyeglasses 10 on the face of the user, similarly to any conventional pair of eyeglasses. Each lens 16 and 18 is additionally connected to an extension arm 22 of the frame 10 by ferromagnetic studs 14. Shown are the clear lenses 16 and 18 having holes 19 extending there through for receiving the ferromagnetic studs 14 and thereby securing the lens to the nose bridge 12 and arm extensions 22. The ferromagnetic studs 14 include a head portion 34 having a larger circumference than that of the hole 19, thereby preventing the stud 14 from passing completely through the hole 19. The head 34 of the ferromagnetic studs 14 is positioned on an outer surface of lenses 16 and 18 when connecting the lenses 13 to the frame 10. The ferromagnetic head 34 of the stud 14 forms a connection with the magnet 30 of the clip-on lenses 11 thus anchoring the clip-on lenses 11 to a front of the lenses 16 and 18.

Figure 3:
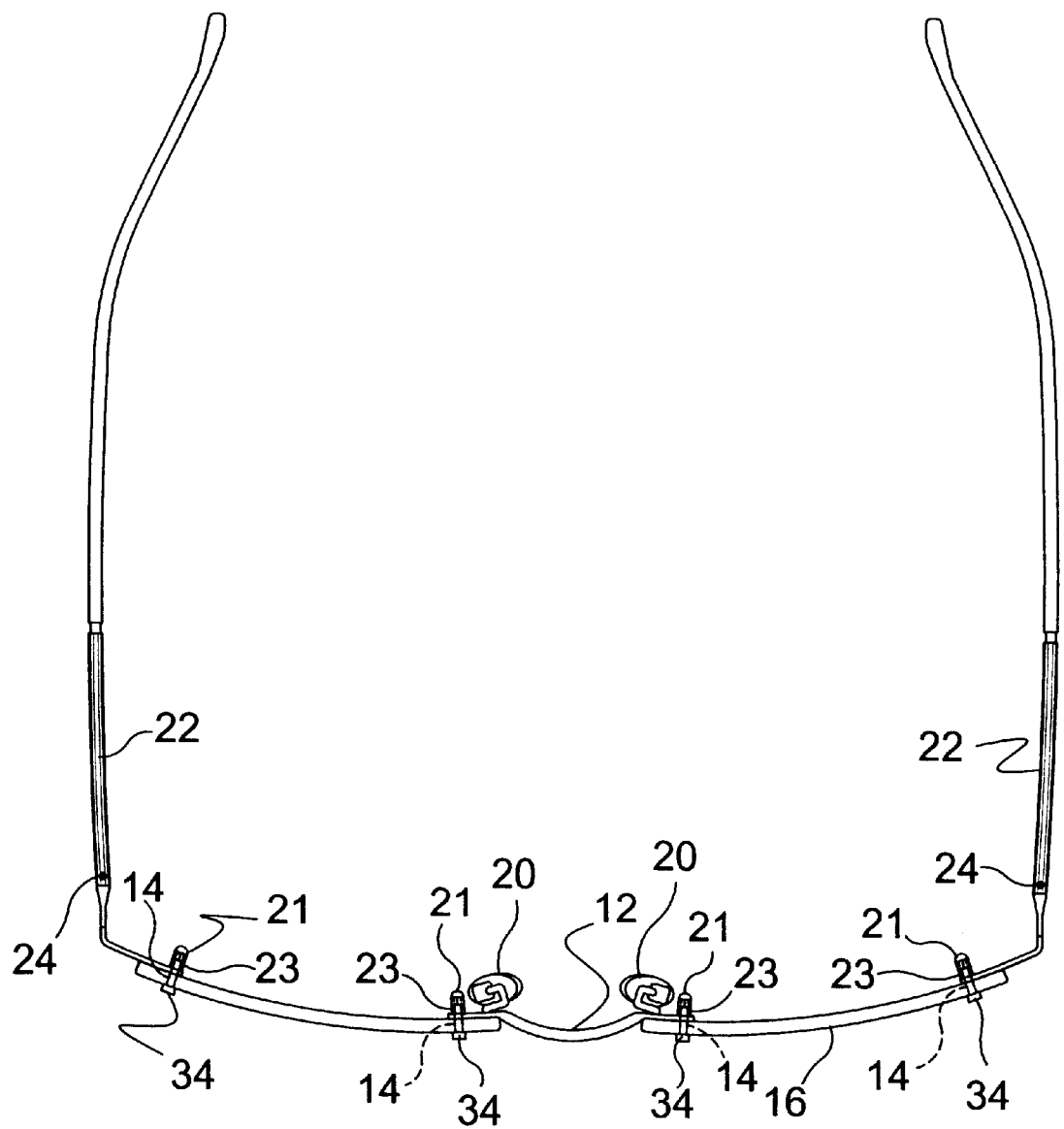
FIG. 3 is a top view of a pair of eyeglasses of the present invention.

FIG. 3 is a top view of the eyeglass frame of the present invention 10. The eye glass frame of the present invention 10 functions similarly to conventional eyeglass frames in that it positions the lenses 16 and 18 thereof for placement in front of a user's eyes when the nose of the user is received by the nose pads 20 of the nose bridge 12 and the extension arms 22 rest on respective ears of the user. Typical of most eyeglasses, the frame of the present invention 10 the extension arms 22 are pivotally connected and can thereby be folded into a more compact position for easy carrying. The interlocking extrusion of the two-piece extension arm 22 is connected with a screw 24 that acts as a pivot point and allows the extension arm to be folded inward for collapsing the frame into a compact form when not in use. Shown are two ferromagnetic studs 14 extending through each lens 16 and 18. Each ferromagnetic stud 14 includes the ferromagnetic head for establishing a connection with the magnet 30 of the clip-on lenses 11, thereby securing to anchor the clip-on lenses 11 on top of the lenses 13 connected to the frame 10. A threaded shaft 23 extends from the head 34, allowing a cap nut 21 to secure the respective lens to the nose bridge 12 and extension arms 22.

Figure 4:
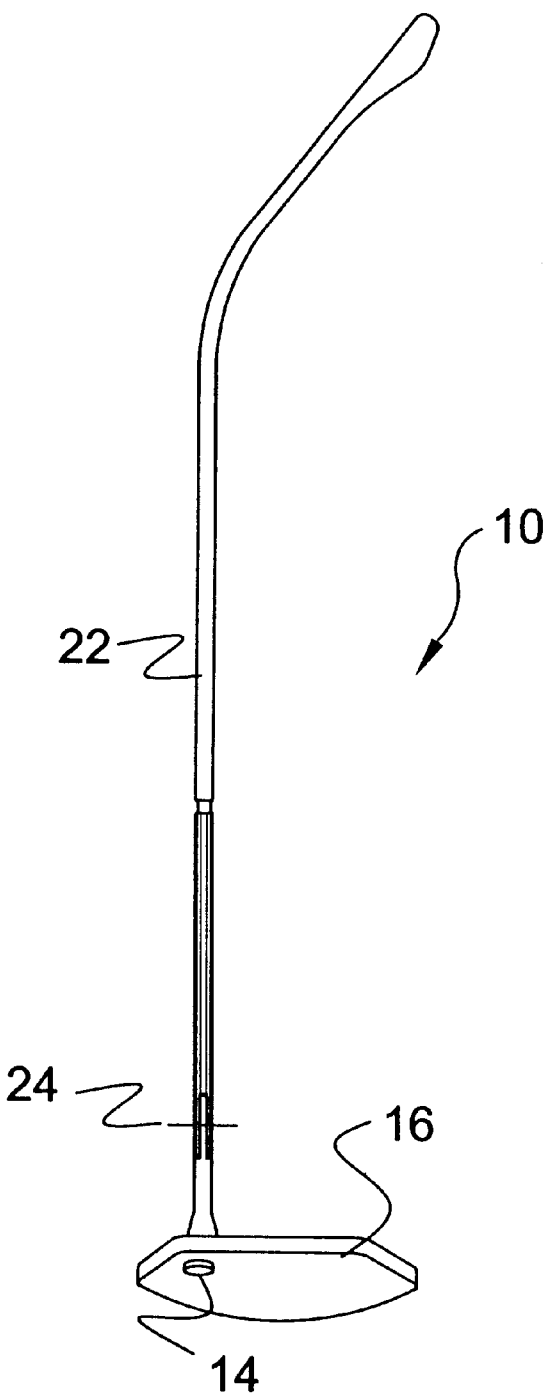
FIG. 4 is a side view of a pair of eyeglasses of the present invention.

FIG. 4 is a side view of the eyeglass frame of the present invention 10. Typical of most eyeglasses, the extension arms 22 are pivotally connected to the frame 10 and can thereby be folded into a more compact position for easy carrying. The extension arm 22 is pivotally connected to the frame 10 with a screw 24 acting as a pivot point. Shown is the left lens 16 connected to an extension arm 22 by a ferromagnetic stud 14 extending through the lens 16. The ferromagnetic stud 14 includes the ferromagnetic head 34 on the outer surface of the lens 16. Each ferromagnetic stud 14 includes the ferromagnetic head for establishing a connection with the magnet 30 of the clip-on lenses 11, thereby securing to anchor the clip-on lenses 11 on top of the lenses 13 connected to the frame 10. A threaded shaft 23 extends from the head 34 allowing a cap nut 21 to secure the respective lens to the nose bridge 12 and extension arms 22.

Figure 5:
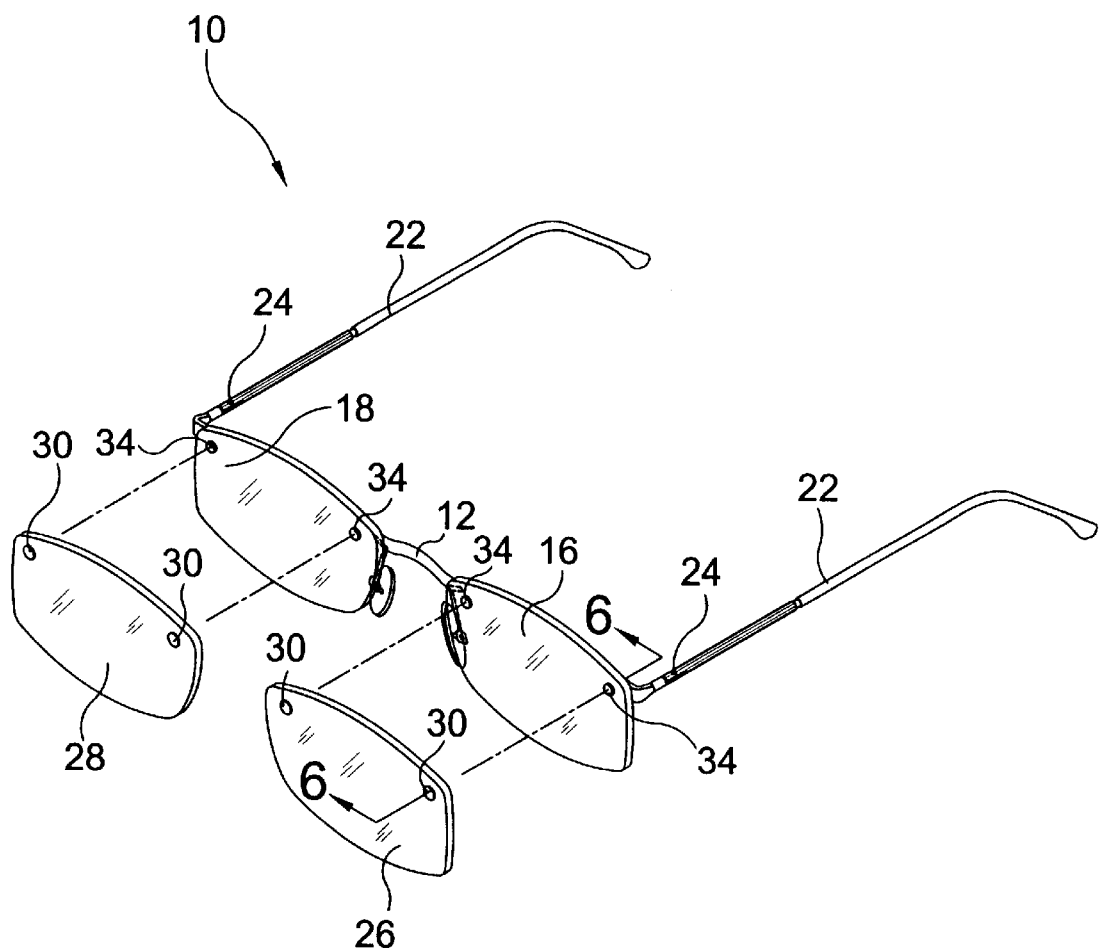
FIG. 5 is an isometric view of a pair of eyeglasses and the clip on lenses of the present invention.

FIG. 5 is an isometric view of the present invention 10 having clip-on lenses 26 and 28. The left clip-on lens 26 and right clip-on lens 28 each include magnets 30 extending therethrough. The lenses are each individually fastened to cover a respective lens, which is connected to the frame 10 of the present invention by the magnets 30. The magnets 30 are positioned such that when clipped into place, the magnets 30 within the clip-on lenses 26 and 28 are aligned with the heads of the ferromagnetic studs 14 on the respective left and right lens 16 and 18. The clip-on lenses 26 and 28 are shaped to the same dimensions of the lenses 16 and 18 respectively to be attached thereto. The frame 10 can accommodate different lens shapes. In such instances, the respective clip-on lenses would be shaped accordingly.

Figure 6:
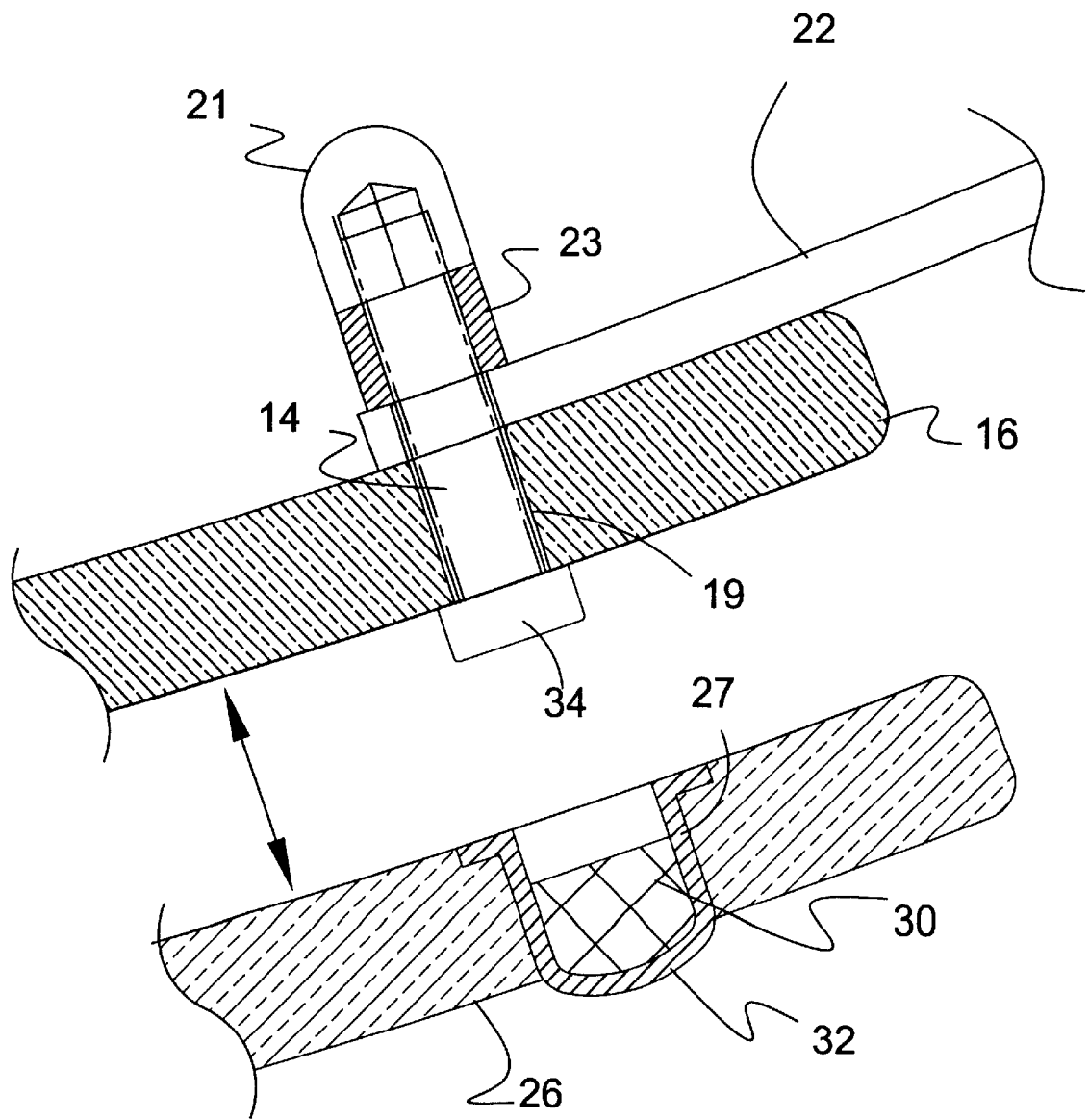
FIG. 6 is a cross-sectional view of a ferromagnetic stud connecting an extension arm to the left lens to form the eyeglass frame and the magnet within the left clip-on lens of the present invention.

FIG. 6 is a detailed cross-sectional view of a ferromagnetic stud 14 connecting an extension arm 22 to the left lens 16, forming the eyeglass frame 10 of the present invention and the magnet 30 within the left clip-on lens 26. The ferromagnetic stud 14 is inserted into a hole 19 in the left lens 16 so that the head of the stud 14 rests upon the front surface of the lens 16. The ferromagnetic stud 14 includes a threaded shaft 23 extending from the head 34. The extension arm 22 has a hole 25 at one end for receiving the shaft of the stud 14. The extension arm 22 is slid over the threaded end of the stud 14. A cap nut 21 is then fastened to the threaded stud 14 on a side opposite the head 34, thereby securing the extension arm to the lens. Similarly, the right lens 18 is connected to its extension arm 22 in the same fashion. Additionally, the nose bridge 12 is mounted to both lenses 16 and 18 in a similar fashion.

The left clip-on lens 26 has a hole 27 through which a cup 32 is embedded. The cup 32 contains a magnet 30 positioned therein. The cup 32 and the head of the stud 14 have a substantially equal diameter. When the clip-on lens 11 is positioned against the lens 13, the head 34 will be received within the cup 32. In this position, the surfaces of the magnet 30 and the head 34 are preferably in contact. The ferromagnetic properties of the head 34 form a magnetic connection with the magnet 30 to thereby selectively secure the clip-on lens 11 atop the lens 13. When the cup 32 is positioned on the head 34 of a stud 14, the magnet 30 and stud head 34 align to mate such that the clip-on lens 26 substantially covers the entire lens 16. The clip-on lens 11 is held in place by the attraction of the magnet 30 to the ferromagnetic stud head 34. Similarly, the right clip-on lens 28 mounts to the right lens 18 in the same fashion.

Figure 7:
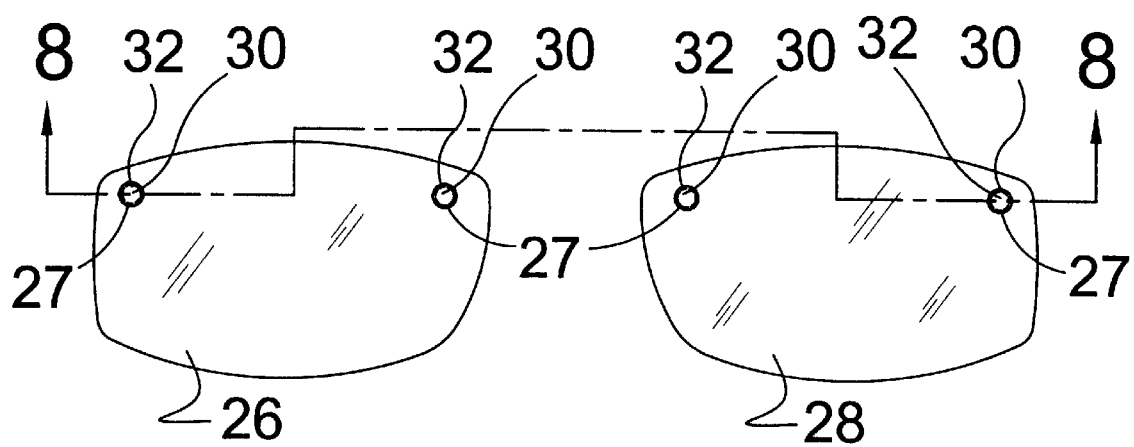
FIG. 7 is a front view of the right and left clip-on lenses of the present invention.

FIG. 7 is a front view of the right clip-on lens 28 and the left clip-on lens 26. The clip-on lenses 26 and 28 are each individually secured to the eyeglass frame of the present invention 10 by two magnets 30. Each clip-on lens 28 includes a hole 27 extending therethrough. Positioned within each hole 27 is a cup 32. Press fitted within each cup 32 is a magnet. To suit style and preference, the clip-on lenses may vary in size, shape, color, and tint. Additionally, the cups 32 are available in various colors including red, black, silver, yellow, brown, green, blue and pink to match the lenses and frame. The shape of the clip-on lens to be used is dependent upon the shape of the lens to be covered. Furthermore, the position of the magnets 30 within the cup 32 of the clip-on lens must substantially align with the studs on the lens to be covered.

Figure 8:
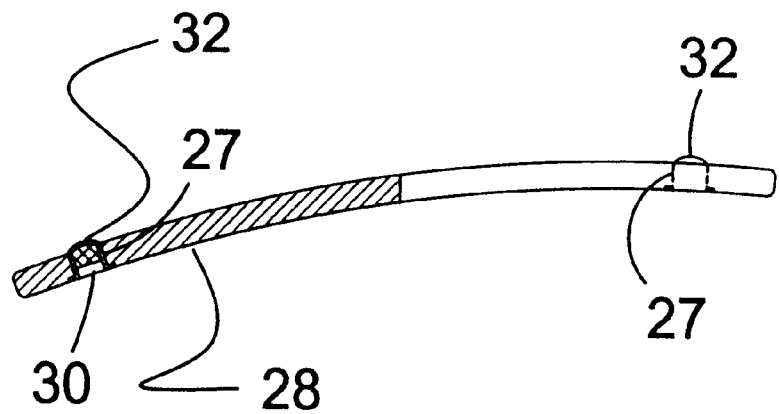
FIG. 8 is a cross-sectional view of the right and left side clip-on lens of the present invention.
Figure 8:
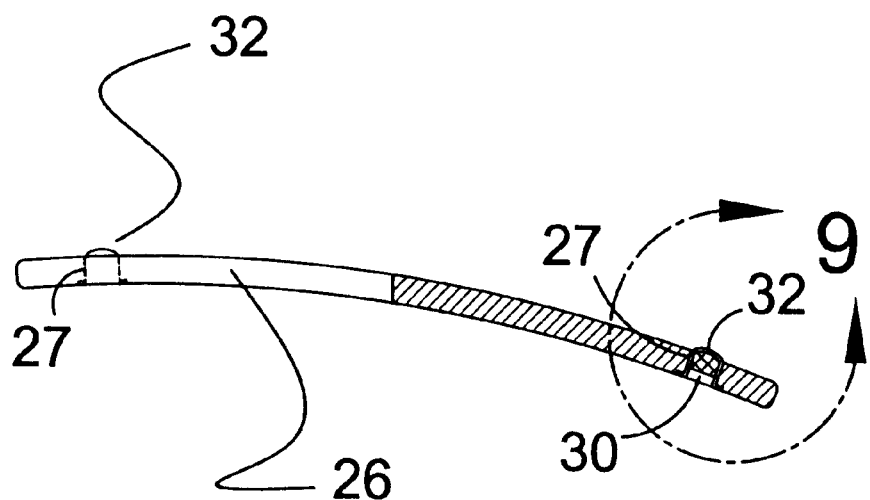

FIG. 8 is a top, partially cross sectional view of the right clip-on lens 28 and the left clip-on lens 26 of the present invention when cut along line 8 as shown in FIG. 7. Shown is the magnet 30 secured within the cup 32. The cup 32 is positioned within the hole 27 in the clip-on lens 11. The magnet 30 is press fitted into the cup 32 and recessed to enable the head of the ferromagnetic stud 14 attached on the frame 10 to also be received within the cup 32.

Figure 9:
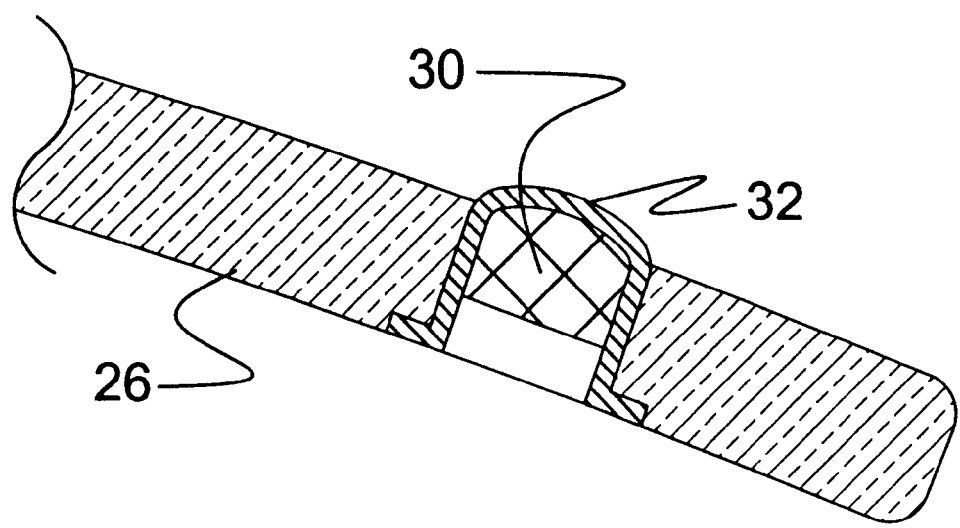
FIG. 9 is a cross-sectional partial view of the left clip-on lens of the present invention taken from within the circle labeled 9 in FIG. 8.

FIG. 9 is a cross-sectional view of the left side clip-on lens magnet 30. As can be seen from this figure, the magnet 30 is secured within the cup 32. The cup 32 is positioned to extend through the hole 27 in the clip-on lens 11. The hole 27 includes a counter bore to allow the cup 32 to be press fitted flush with the inner surface of the lens. The magnet 30 is press fitted into the cup and recessed therein to enable the head of the stud 14 on the frame 10 to be received within the cup 32 and preferably contact the magnetic surface. Each cup 32 is positioned in the clip-on lens, 26 or 28, whereby the open side of the cup 32 faces the head 34 of the ferromagnetic stud 14 of the frame of the present invention 10.

Figure 10:
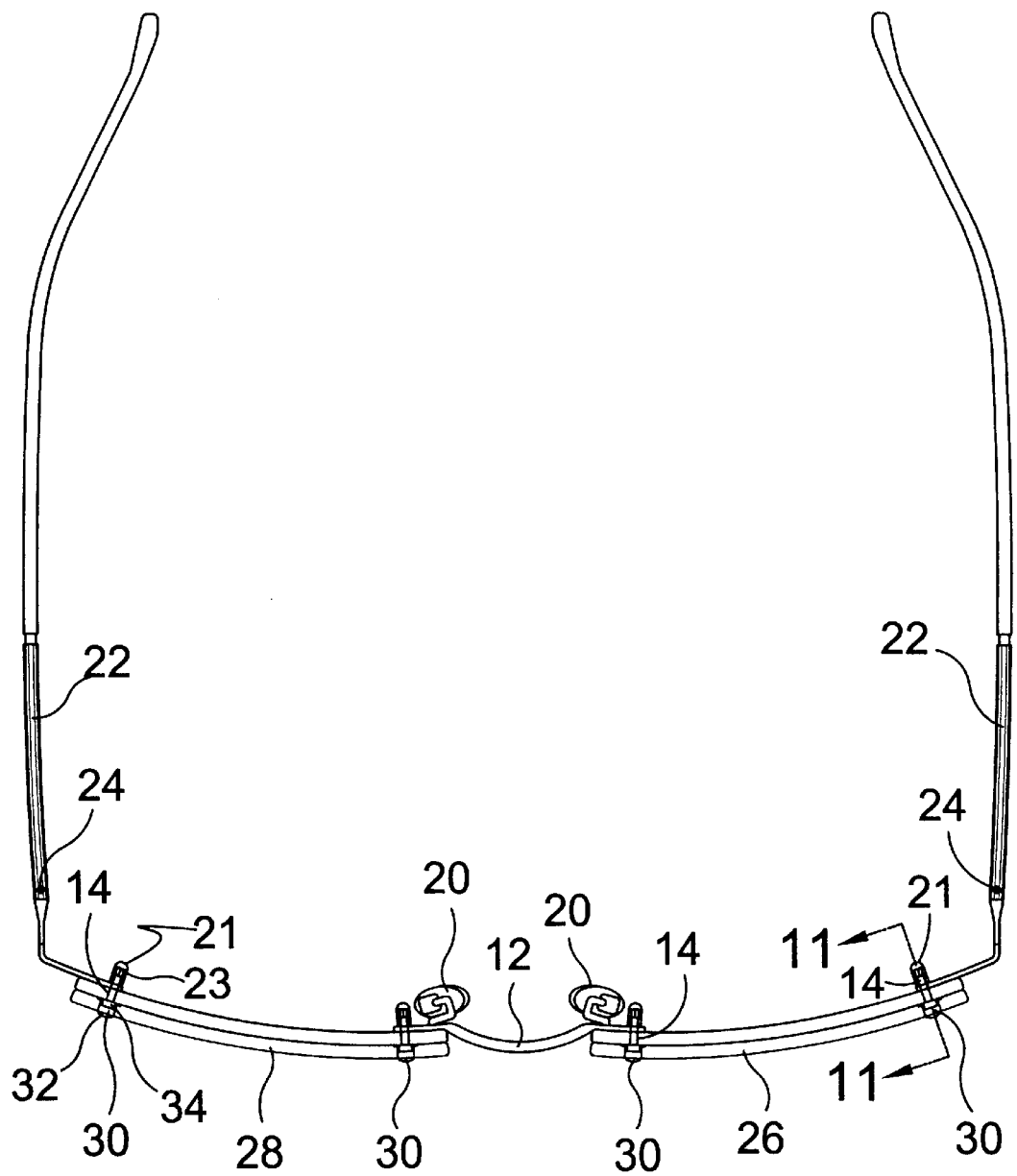
FIG. 10 is a top view of the eyeglass frame with the accompanying clip-on lenses attached thereto in accordance with the present invention.

FIG. 10 is a top view of the eyeglass frame 10 of the present invention with the accompanying clip-on lenses 26 and 28 positioned to cover the lenses 16 and 18. The eyeglass frame 10 of the present invention functions similarly to conventional eyeglass frames in that it positions the lenses 16 and 18 thereof for placement in front of a user's eyes when the nose of the user is received by the nose pads 20 of the nose bridge 12 and the extension arms 22 rest on respective ears of the user. Typical of most eyeglasses, the extension arms 22 are pivotally connected and can thereby be folded into a more compact position for easy carrying. The interlocking extrusion of the two-piece extension arm 22 is connected with a screw 24 that acts as a pivot point and allows the extension arm to be folded inward for collapsing the frame into a compact form when not in use. The extension arms 22 are illustrated in their extended form.

As shown in the figure, each lens 16 and 18 is connected to the frame 10 by two ferromagnetic studs 14. The ferromagnetic studs 14 are inserted into a hole 19 in the lenses 16 and 18 so that the head 34 of the stud 14 rests upon the front surface of the lenses 16 and 18. The head 34 is slightly larger in diameter than the hole 19, thereby preventing the stud 14 from sliding completely through the hole 19. The ferromagnetic stud 14 includes a threaded shaft 23 extending from the head 34. The extension arms 22 have a hole 25 at one end for receiving the shaft of the stud 14. The nose bridge 12 has a similarly hole at each of it's opposite ends for receiving the shaft 23 of the stud 14. The extension arms 22 and nose bridge 12 are slid over the threaded end of the stud 14. A cap nut 21 is then fastened to each threaded shaft 23, thereby securing the extension arms 22 and the nose bridge 12 to the lenses 16 and 18. The lenses could be clear or prescription or have different size, shape and tint dependant upon preference.

Each lens may be selectively covered with a clip-on lens. As illustrated in the figure, left clip-on lens 26 and right clip-on lens 28 are aligned with the lenses 16 and 18 respectively. Each clip-on lens contains a hole 27 in which a cup 32 is mounted and the magnet 30 is secured within the cup 32. The cup 32 is positioned to extend through the hole 27 in the clip-on lens 11. The hole 27 includes a counter bore to allow the cup 32 to be press fitted flush with the inner surface of the lens. The magnet 30 is press fitted into the cup and recessed therein to enable the head 34 of the stud 14 on the surface of the lenses 13 to be received within the cup 32 and preferably contact the magnetic surface. Each cup 32 is positioned in the clip-on lens, 26 or 28, whereby the open side of the cup 32 faces the head 34 of the ferromagnetic stud 14 of the frame of the present invention 10. To suit style and preference, the clip-on lenses may vary in size, shape, color, and tint. The shape of the clip-on lens to be used is dependant upon the shape of the lens to be covered. Furthermore, the position of the magnets 30 within the cup 32 of the clip-on lens must substantially align with the studs on the lens to be covered.

When the clip-on lens 11 is positioned against the lens 13, the head 34 will be received within the cup 32. In this position, the surfaces of the magnet 30 and the head 34 are preferably in contact. The ferromagnetic properties of the head 34 form a magnetic connection with the magnet 30 to thereby selectively secure the clip-on lens 11 atop the lens 13. When the cup 32 is positioned on the head 34 of a stud 14, the magnet 30 and stud head 34 align to mate such that the clip-on lens 26 substantially covers the entire lens 16. The clip-on lens 11 is held in place by the attraction of the magnet 30 to the ferromagnetic stud head 34.

Figure 11:
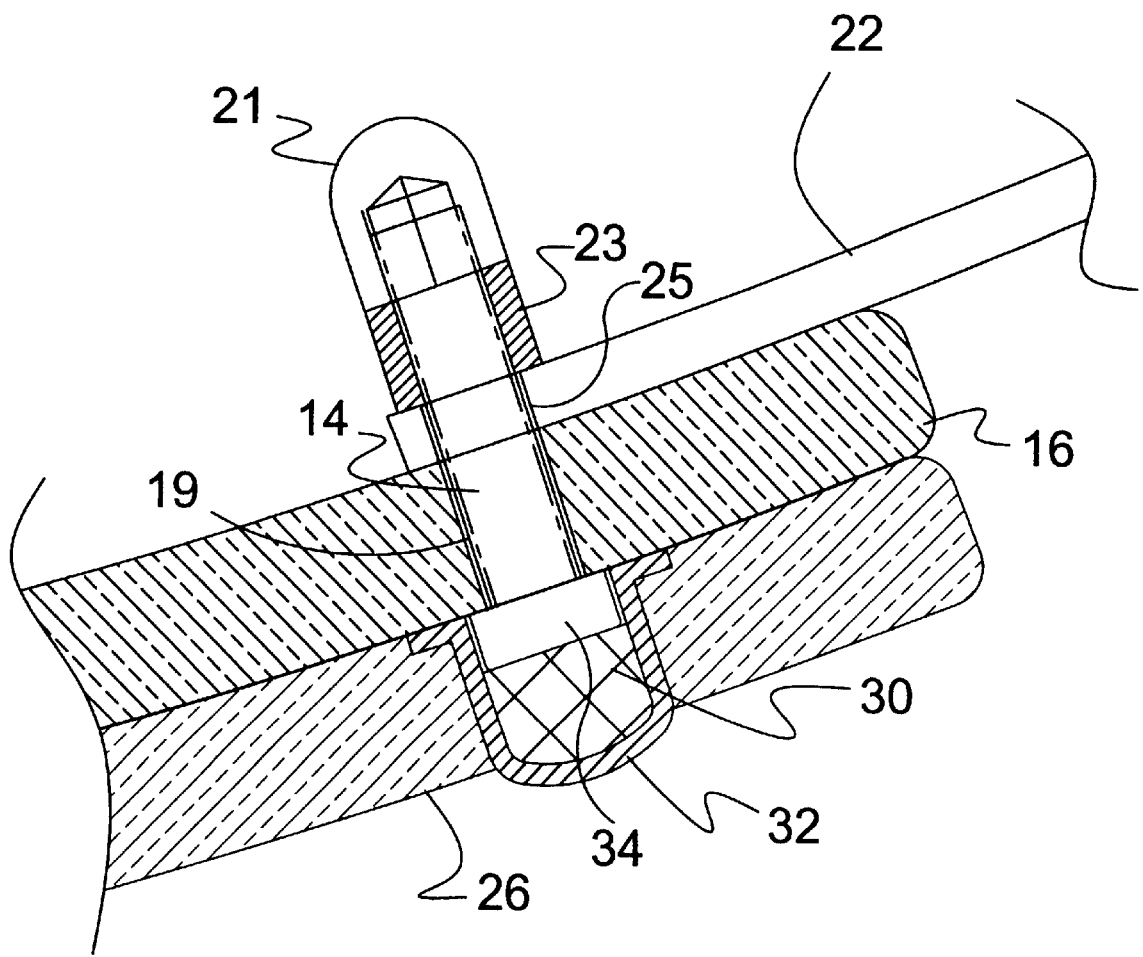
FIG. 11 is a cross-sectional view taken along the line 11—11 as illustrated in FIG. 10 showing the connection between a clip-on lens and the eyeglass frame of the present invention.

FIG. 11 is a cross-sectional view taken along the line 11—11 as illustrated in FIG. 10 showing the connection between the left clip-on lens 10 and the extension arm 22 of the eyeglass frame 10 of the present invention. As shown in the figure, lens 16 is connected to the extension arm 22 by a ferromagnetic stud 14. The ferromagnetic stud 14 is inserted into a hole 19 in the lens 16 so that the head 34 of the stud 14 rests upon the front surface of the lens 16. The head 34 is slightly larger in diameter than the hole 19, thereby preventing the stud 14 from sliding completely through the hole 19. The ferromagnetic stud 14 includes a threaded shaft 23 extending from the head 34. The extension arm 22 has a hole 25 at one end for receiving the shaft of the stud 14. The extension arm 22 is slid over the threaded end of the stud 14. A cap nut 21 is then fastened to the threaded shaft 23, thereby securing the extension arm 22 and to the left lens 16. The lens could be clear or prescription or of various sizes, shapes and tints dependant upon preference.

The lens 16 may be selectively covered with a clip-on lens 26. As illustrated in the figure, left clip-on lens 26 is aligned with the left lens 16. The left clip-on lens 26 contains a hole 27 in which a cup 32 is inserted and the magnet 30 is secured within the cup 32. The cup 32 is positioned to extend through the hole 27 in the clip-on lens 11. The hole 27 includes a counter bore to allow the cup 32 to be press fitted flush with the inner surface of the lens. The magnet 30 is press fitted into the cup and recessed therein to enable the head 34 of the stud 14 on the surface of the lenses 16 to be received within the cup 32 and preferably contact the magnetic surface. Each cup 32 is positioned in the clip-on lens, 26 or 28, whereby the open side of the cup 32 faces the head 34 of the ferromagnetic stud 14 of the frame of the present invention 10. To suit style and preference, the clip-on lenses may vary in size, shape, color, and tint. The shape of the clip-on lens to be used is dependent upon the shape of the lens to be covered. Furthermore, the position of the magnets 30 within the cup 32 of the clip-on lens must substantially align with the studs on the lens to be covered.

When the clip-on lens 11 is positioned against the lens 13, the head 34 will be received within the cup 32. In this position, the surfaces of the magnet 30 and the head 34 are preferably in contact. The ferromagnetic properties of the head 34 form a magnetic connection with the magnet 30 to thereby selectively secure the clip-on lens 26 atop the left lens 16. When the cup 32 is positioned on the head 34 of a stud 14, the magnet 30 and stud head 34 align to mate such that the clip-on lens 26 substantially covers the entire lens 16. The clip-on lens 11 is held in place by the attraction of the magnet 30 to the ferromagnetic stud head 34.

It will be understood that each of the elements described above, or two or more together may also find a useful application in other types of methods differing from the type described above.

While certain novel features have been shown and described and are pointed out in the annexed claims, it is not attended to be limited to the details above, since it will be understood that various omissions, modifications, substitutions, and changes in forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic aspects of this invention.

What is new and desired to be protected by Letters Patent is set in the appended claims:

1. A pair of eyeglasses comprising:
  a) first and second transparent lenses, each lens including at least two holes extending therethrough;
  b) first and second arms;
  c) a nose bridge;
  d) a plurality of ferromagnetic studs, each of said plurality of studs extending through a respective hole in said first and second lenses for connecting said first lens between said first arm and said nose bridge and said second lens between said second arm and said nose bridge, each of said ferromagnetic studs having a head protruding from a front surface of the transparent lens through which said stud extends;
  e) first and second clip-on lenses, each lens including at least two holes extending therethrough and aligned with the holes in said transparent lenses;

f) a cup mounted in each of the holes in said clip-on lenses, each cup having an opening facing a transparent lens, each cup having a lip around said opening flush with a surface of said clip-on lens facing a transparent lens and a closed end on and bulging from a surface of the clip-on lens opposite the facing surface of said clip-on lens; and g) a plurality of magnets, each of said plurality of magnets being positioned within a a cup in said first and second clip-on lenses, each cup adapted to receive the head from a stud so that the facing surface of each clip-on lens is flush with and in contact with the front surface of a transparent lens, wherein upon positioning said first and second clip-on lenses against said first and second transparent lenses respectively, and aligning said holes, a magnetic coupling is formed between said aligned magnets and ferromagnetic studs thereby selectively holding said first and second clip-on lenses to said first and second transparent lenses respective respectively.

2. The pair of eyeglasses as claimed in claim 1, further comprising a plurality of fasteners, each of said fasteners being secured to said threaded shaft of a respective stud on a side opposite said head upon insertion of said shaft into said hole.

3. The pair of eyeglasses as recited in claim 1, wherein said first and second clip-on lenses have a size and shape substantially similar to a size and shape of said first and second transparent lenses.

4. The pair of eyeglasses as recited in claim 1, wherein said first arm is pivotally connected to said first lens and said second arm is pivotally connected to said second lens whereby said first and second arms are selectively collapsible when said pair of eyeglasses are not in use.

5. A combination of pair of eyeglasses and clip-on lenses consisting of:

a) said eye glasses having first and second transparent lenses, each lens including at least two holes extending therethrough;

b) a stud of magnetizable material in each of said holes, c) first and second clip-on lenses, each lens having holes extending therethrough aligned with the holes in said transparent lenses;

d) means including a magnet mounted in each of the holes of said clip-on lenses to allow magnetic coupling between said studs and said magnets for securing said clip-on lenses to said transparent lenses with facing surfaces of said transparent lenses and clip-on lenses flush with and in contact with each other when said clip-on lenses are mounted on said transparent lenses of said eyeglasses; and e) a cup mounted in each of the holes in said clip-on lenses for containing said magnet and receiving a stud, each cup having an opening facing a transparent lens, each cup having a lip around said opening flush with a surface of said clip-on lens facing a transparent lens and a closed end on and bulging from a surface of the clip-on lens opposite the facing surface of said clip-on lens.

\* \* \* \* \*